| United States Patent [19] | [11] | 4,360,442 |
|---|---|---|
| Reedy et al. | [45] | Nov. 23, 1982 |

[54] ETHYLENE CARBONATE AS A PHASE-CHANGE HEAT STORAGE MEDIUM

[75] Inventors: James D. Reedy, New Fairfield; Daniel Pittner, Mahopac, both of Conn.

[73] Assignee: Union Carbide Corporation, Danbury, Conn.

[21] Appl. No.: 311,271

[22] Filed: Oct. 14, 1981

[51] Int. Cl.$^3$ .............................................. C09K 5/06
[52] U.S. Cl. ..................... 252/70; 126/400; 165/DIG. 4; 556/460; 570/182
[58] Field of Search .................. 252/70; 126/400; 165/DIG. 4; 556/460; 570/182

[56] References Cited

U.S. PATENT DOCUMENTS 3,956,153  5/1976  Chadha ............................... 252/67
4,199,021  4/1980  Thoma .................................. 165/1
4,237,964  12/1980  Larue et al. ........................... 165/1
4,272,391  6/1981  Lane et al. ............................ 252/70

OTHER PUBLICATIONS

R. H. Montgomery, J. K. Budnik, The Solar Decision Book, Dow Corning Corporation, Midland, Michigan, pp. 14–15.
B. Anderson, M. Riordon, The Solar Home Book Brick House Publishing Co., Harrisville, New Hampshire, p. 191.

*Primary Examiner*—John E. Kittle
*Assistant Examiner*—Robert A. Wax
*Attorney, Agent, or Firm*—Gary L. Wamer

[57] ABSTRACT

Ethylene carbonate is used as a heat storage medium in a process for the storage of heat wherein the medium changes phase during the release and absorption of heat.

3 Claims, No Drawings

ETHYLENE CARBONATE AS A PHASE-CHANGE HEAT STORAGE MEDIUM

The present invention is directed to a heat storage medium such as those used in solar heating applications used for heating interior spaces of buildings and the like. More specifically the present invention involves the use of ethylene carbonate as a phase-change heat storage medium in such process.

Currently, a widely used method for storage of heat in solar energy applications involves the use of water as a heat storage medium, wherein the water is heated by the sun and is later cooled to release the stored heat as it is needed. Water is widely used for this purpose because it is readily available and has low corrosivity. However, in order to store practical amounts of heat, a large volume of water is necessary, requiring that large areas be dedicated to water storage.

Another method involves the use of rocks as a heat storage medium, generally in conjunction with a pumped fluid such as air to carry the heat to and from the storage area where the rocks are contained, the solar energy collectors and rooms to be heated. As with heat storage with water, heat storage with rocks requires a large volume of rocks to be practical.

In a process where the medium does not go through a phase-change during the heating and cooling cycle, such as those using water or rocks, the heat is stored as an increase in enthalpy of the storage medium as it is heated. Heat is released as the storage medium cools and the enthalpy of the medium is lowered.

This can be mathematically illustrated by equation (1).

$$Q = M \cdot \int_{T_1}^{T_2} C_{pm} dT \tag{1}$$

where Q is the amount of heat released or absorbed as the medium is cooled or heated between temperatures $T_1$, and $T_2$, i.e., the amount of the heat stored in the medium during the heating-cooling cycle, M is the mass of the medium, $T_2$ is the highest temperature of the heating-cooling cycle, $T_1$ the lowest temperature of the heating-cooling cycle, $C_{pm}$ the constant pressure heat capacity of the heat storage medium and dT the differential temperature. Generally in the temperature ranges involved in solar heat storage the heat capacity is approximately constant, therefore, the simpler equation employed is $$Q = M \cdot C_{pm}(T_2 - T_1). \tag{2}$$

It can be seen from the above equations that there must be a change in temperature for heat to be absorbed or released and the amount of heat stored is proportional to the heat capacity. Thus, the amount of heat that can be stored is dependent on the temperature range of the heating and cooling cycle and also upon the magnitude of the heat capacity.

Because of the inherent magnitudes of the heat capacities of substances currently or previously used as single phase heat storage media and the temperature ranges employed in heat storage methods, generally the only way to store practical amounts of heat in a single-phase process is to have a large mass of the heat storage medium.

Since such a mass is undesirable in the typical case it has been proposed to use a medium that changes phase during the heating and cooling cycle. Generally suggested are media that would melt upon being heated and solidify upon being cooled. In such a process the heat would be stored in the form of the heat of fusion of the medium. During the change in phase, heat would be released or absorbed without a change in temperature of the medium as it is freezing or melting. The heat storage process using such a phase-change medium can be represented mathematically as $$Q = M \cdot \int_{T_m}^{T_2} C_{pl} dT + M \cdot h_f M \cdot \int_{T_1}^{T_m} C_{ps} dT \tag{3}$$

where $C_{ps}$ and $C_{pl}$ are the heat capacities per unit mass for the solid and liquid respectively, $T_m$ is the temperature of the melting point of the medium, $h_f$ is the heat of fusion, and Q, M, dt, $T_1$, and $T_2$ are defined as above. Assuming the heat capacities are approximately constant, then $$Q = M[(T_2 - T_m)C_{pl} + h_f + (T_m - T_1)C_{ps}] \tag{4}$$

If the heat of fusion is high and the temperature range is narrow, then the heat capacity terms in Equation (4) are not significant and it can be further simplified to $$Q = M h_f \tag{5}$$

From Equation (5) it can be seen that if the heat of fusion is high, the mass of the medium can be proportionately reduced. It can also be seen that the release or absorption of heat does not require a change in temperature of the medium while it is freezing or melting. Thus, a substance may be useful as a phase-change heat storage medium if it melts and solidifies within the temperature range encountered in solar heat storage methods. This would be from about room temperature (20°–25° C.) to temperatures obtainable from solar heat collection devices, about 50° C.

A suitable phase-change heat storage medium would also have a high heat of fusion in order to reduce the mass or the volume required to store the necessary amount of heat. Also, if the heat of fusion of the medium is high, the temperature range of the heating and cooling cycle need only be in a narrow range encompassing the melting temperature to provide for the storage of relatively large amounts of heat.

Certain paraffins have been suggested as phase-change media, as for example in *The Solar Home Book* by Bruce Anderson and Michael Riondan, Brick House Publishing Co., Harrisville, Hampshire at p. 191. The paraffins suggested are certain paraffins commercially available for use in solar heat applications. These paraffins are cheaper than eutectic salts and have a relatively high heat of fusion of around 36 calories per gram. However, they have their own unique problems. They degrade plastics and corrode some metals such as copper. When exposed to air hot paraffins slowly oxidize or degrade to form more corrosive oxidation products, such as organic acids. Another difficulty, as reported by B. Anderson and M. Riordan in *The Solar Home Book*, cited above, lies in the fact that paraffin expands by about 20% when it melts, thereby causing problems of containment. When it solidifies and releases stored heat, the paraffin shrinks and pulls away from the container wall, drastically slowing the rate of the transfer of heat out of the container.

Certain eutectic salts have also been proposed as heat storage media because of their high heats of fusion and their melting points within the appropriate range. These salts are particularly desirable because of their high heats of fusion, thus they are usuable in small volume applications. Among the salts suggested are sodium sulfate decahydrate (melting point 32° C., heat of fusion 51 cal/g), calcium chloride hexahydrate (melting point 30° C., heat of fusion 40.7 cal/g), sodium carbonate decahydrate (melting point 32.5°-34.5° C.), calcium nitrate tetrahydrate (melting point 39.7° to 42.7° C.) and sodium thiosulfate pentahydrate (melting point 40°-45°).

However, eutectic salts are extremely corrosive when compared water or organic phase-change media such as the paraffins discussed above. Also, the proposed salts are hydrates. It is well known that hydrated salts when exposed to varying humidity and temperature conditions will change their composition or degree of hydration. In eutectic salts this results in a solid phase that does not melt at an appropriately low temperature. Thus, when used as phase-change heat storage media, eutectic salts cannot be stored in conventional storage tanks but must be packaged in special non-corrosive containers that are sealed to maintain the salt's composition. R. H. Montgomery and J. K. Budnik in *The Solar Decision Book*, published by Dow Corning Corporation, Midland, Mich., at page. 14-5, referring to eutectic salts and paraffins, state the following:

"Phase-changing materials meet the requirements for small-volume heat storage. However, they are not commercially feasible at this time. The costs of properly packaging these materials in some type of container that would work for solar storage are currently prohibitive. There are performance problems as well. The materials work only within a narrow temperature range, and they require frequent replacement."

"These shortcomings of phase-changing materials plus the lack of other suitable storage concepts—leaves water and rocks as the best solar storage choices at this time. Water and rocks should continue as the most popular storage materials for at least the next five years."

The present invention describes the use of a new and unexpected heat storage medium, ethylene carbonate. The medium is stable, has a suitable melting temperature, has a relatively high heat of fusion and is non-corrosive to common metals of construction. It has also been found that ethylene carbonate, when used as a phase change medium, can go through repeated heating and cooling cycles without any loss of effectiveness as a heat storage medium. Thus, it can be used in small volume applications, yet present no unusual difficulties in packaging or require frequent replacement. Additionally the heat storage medium of the invention has good oxidative stablility, low cost, low toxicity, a moderate flash point and does not appear to shrink or expand upon freezing. Thus, the heat storage medium of the invention has the balance of properties that provides for efficient low volume heat storage but also for ease of handling and safety; all of which are desired for home solar-heating applications.

The heat storage medium comprises ethylene carbonate. Ethylene carbonate, otherwise known as glycol carbonate, 1,3-dioxolan-2-one and 1,2-ethanediol carbonate, has a freezing point of 35°-36° C. and a heat of fusion of 27.3 calories per gram. Preferably the ethylene carbonate also contains an additive that is solid at a temperature at or above the melting point of ethylene carbonate to minimize or prevent supercooling.

The additive may be organic or inorganic and soluble or insoluble in ethylene carbonate. Suitable additives are those that form crystals before the ethylene carbonate begins to solidify and do not substantially disrupt the crystal structure of the solid ethylene carbonate as it forms. Suitable additives include paradichlorobenzene and hexamethylcyclotrisiloxane. The additive should remain suspended or dispersed in ethylene carbonate.

Ethylene carbonate can decompose at temperatures greater than 220° C. or when the pH is below 5 or above 9. A homogeneous or heterogenous buffer may be added to hinder or prevent decomposition. Suitable buffers include phosphate esters and their salts. Particulary suitable are mixtures of sodium and potassium salts of mono- and diorgano- phosphate/esters. The nature and chemistry of these buffers are well known in the art.

The additive, when used, should be present from about 0.001 to about 10 weight percent preferably from about 0.01 to 1 weight percent based on the total weight of the medium. Since the additive is added to reduce or prevent supercooling, usually only a small amount, most preferably less than 0.5 weight percent, is necessary. The combined amounts of additive and buffer should not exceed about 10 weight percent, based on the weight of the medium. Amounts higher than this amount can disrupt the crystal structure of solid ethylene carbonate and thereby reduce its lattice energy or heat of fusion. Preferably the additive should not co-solidify with the ethylene carbonate but be excluded as it freezes.

The use conditions are not critical. It is not expected that pressures higher than atmospheric pressure would alter the system performance. Generally the most convenient pressure would be atmospheric pressure. The optimum range of the heating-cooling cycle would be the narrowest range that includes the melting and freezing temperatures of the medium. However, in typical solar energy applications the temperature would range from the desired temperature of the space to be heated, generally about 20°-25° C. to the temperature generally obtainable from solar collection devices, about 50° C. or below. The temperature should not exceed 200° C. or the ethylene carbonate may decompose.

The ethylene carbonate heat storage medium of the invention could be employed in passive or active solar systems. Active systems are those using mechanical pumps or blowers to transport the solar energy in a fluid from the collector to the house or storage area. Passive systems do not employ pumps or blowers. In active systems the ethylene carbonate medium would probably be contained in a large reservoir located in the basement or underground. In either case the tank would be well insulated and heat exchanges would be used to add or extract heat. Passive solar ethylene carbonate medium would probably be contained in tubes or drums located where the sun is shining as in a window with southern exposure where the sun could directly or indirectly warm it. In the evening when the house starts to cool the ethylene carbonate would start to freeze and release heat. The fact that the melting point of ethylene carboate is about 15° C. above room temperature would facilitate good heat transfer by convection.

The following examples are not intended to limit the invention in any way. In these examples, the temperature was measured using a thermocouple equipped with a chart recorder. In Examples 1 and 2 an iron-constantan thermocouple was used. In Examples 3,4 and 5 a copper-contantan thermocouple was used. The purity of the ethylene carbonate used was greater than 99 weight percent.

EXAMPLE 1

A 4 oz. capacity beaker containing 88 grams of ethylene carbonate was heated to 69° C. and allowed to cool. The temperature dropped to 21° C., then quickly rose to 34° C. demonstrating supercooling of the liquid. The 34° C. temperature persisted for 84 minutes as the ethylene carbonate solidified, after which the temperature dropped, until ambient temperature was reached.

EXAMPLE 2

A 4 oz. capacity beaker containing 88 grams of ethylene carbonate was heated to 62° C. 0.2 grams of paradichlorobenzene was added and the contents allowed to cool. The temperature dropped to 31° C. and then quickly rose to 33° C. The temperature remained constant for 60 minutes while the ethylene carbonate was freezing. The solution was reheated and allowed to cool a second time. This time the liquid supercooled to 25° C.

In Example 1 a pure sample of ethylene carbonate liquid was shown to supercool 13° C. below the melting temperature of medium. This is generally not desirable, it being preferable that the medium begin to solidify at as high temperature as is possible, i.e., as near the melting point of the substance as is possible. In this example, use of an additive was shown to partially eliminate supercooling.

EXAMPLE 3

To the mixture of Example 2, an additional 0.1 grams of paradichlorobenzene were added to give a mixture containing 88 grams of ethylene carbonate and 0.3 grams of paradichlorobenzene. This mixture was reheated to 64° C. in the same beaker and allowed to cool. It took 32 minutes to cool to 34° C. after which it quickly rose to 35° C. and remained at that temperature for 112 minutes before it began to drop. This heating-cooling cycle was repeated six more times and the mixture did not supercool more than 1° C. in any of these cycles.

EXAMPLE 4

A 4 oz. capacity beaker containing another mixture of 88 grams of ethylene carbonate and 0.3 grams of paradichlorobenzene was heated to 70° C. and allowed to cool. The sample cooled to 34° C. and then quickly rose to 35° C. As it froze, the temperature remained at 35° for 120 minutes. It was recycled through heating and cooling two more times and did not supercool more than 1° C. during any of these cycles.

Examples 3 and 4, as compared to Example 2, show how slightly more paradichlorobenzene-additive in the phase-change medium further minimizes supercooling of the liquid as it cools.

EXAMPLE 5

A beaker containing 88 grams of ethylene carbonate and 0.3 grams of hexamethylcyclotrisiloxane (m.p. 66° C.) was heated to 77° C. and allowed to cool. The temperature dropped to 30° C. without crystallizing which indicated supercooling. The sample was then reheated to 75° C. and allowed to cool again. The sample cooled to 34° C., then quickly rose to 35° C. and remained at 35° C. for 130 minutes before dropping to room temperature. The cycle was repeated three more times without more than 1° C. of supercooling. This example shows use of another additive, hexamethylcyclotrisiloxane, to inhibit supercooling of the liquid medium.

What is claimed is:

1. In a process for the storage of heat comprising heat transfer to and from a heat storage medium wherein the heat storage medium changes phase as it absorbs or releases heat, the improvement comprising the use of ethylene carbonate containing hexamethylcyclotrisiloxane as the heat storage medium.

2. The process of claim 1 wherein the ethylene carbonate contains from 0.001 to 10 weight percent, based on the total composition, of hexamethylcyclotrisiloxane which minimizes supercooling of the ethylene carbonate as it cools.

3. The process of claim 2 wherein the ethylene carbonate contains 0.01 to 1 weight percent, based on the total composition, of hexamethylcyclotrisiloxane.

* * * * *